United States Patent [19]
Ogino et al.

[11] Patent Number: 5,162,903
[45] Date of Patent: Nov. 10, 1992

[54] APPARATUS FOR SWITCHING BETWEEN TWO ASYNCHRONOUS VIDEO SIGNALS

[75] Inventors: Akira Ogino, Chiba; Masashi Nakamura, Tokyo, both of Japan

[73] Assignee: Sony Corporation, Tokyo, Japan

[21] Appl. No.: 708,293

[22] Filed: May 31, 1991

[30] Foreign Application Priority Data

Jun. 4, 1990 [JP] Japan .................. 2-145875

[51] Int. Cl.⁵ ............................................. H04N 5/268
[52] U.S. Cl. ............................... 358/181; 358/185; 358/149
[58] Field of Search ............... 358/181, 182, 183, 22, 358/142, 146, 147, 148, 149, 185

[56] References Cited

U.S. PATENT DOCUMENTS

| | | | |
|---|---|---|---|
| 4,231,063 | 5/1979 | Ito | 358/181 |
| 4,561,020 | 12/1985 | Matsuda | 358/134 |
| 4,890,162 | 12/1989 | McNeely | 358/22 PP |
| 4,994,916 | 2/1991 | Pshtissky | 358/181 |

Primary Examiner—James J. Groody
Assistant Examiner—Sherrie Hsia
Attorney, Agent, or Firm—Lewis H. Eslinger; Jay H. Maioli

[57] ABSTRACT

An apparatus for switching a video signal comprises a switch for switching a video signal from one to another, a memory for storing an output of the switch, a detector for detecting a switch signal, a switch control circuit for controlling the switch in response to the switch signal, and a memory control circuit for controlling writing and reading of the memory, wherein when the switch signal is detected, the memory control circuit continues to write one video signal until a sync. (synchronizing) signal of the one video signal is detected and after a predetermined period write another video signal when a sync. signal of the other video signal is detected.

4 Claims, 2 Drawing Sheets

APPARATUS FOR SWITCHING BETWEEN TWO ASYNCHRONOUS VIDEO SIGNALS

BACKGROUND OF THE INVENTION

1. Field of the Invention

The present invention generally relates to video signal switching apparatus and, more particularly, is directed to a video signal switching apparatus suitable for use in switching and displaying a plurality of video signals, each having an asynchronous signal.

2. Description of the Prior Art

FIG. 1 shows an example of a prior-art video signal switching apparatus.

As will be seen from FIG. 1, when one of video signals respectively output from a plurality of video tape recorders (VTRs), that is, VTR-A 3 and VTR-B 5 is selectively switched and fed to an output terminal 20, the video signal is selectively switched by a selector 10.

However, a home VTR, for example, is not provided with a gain locking system which enables the video signal to be synchronized with an asynchronous video signal so that, as shown in FIG. 2, when the video signal is simply selected, the video signal becomes discontinuous at the switched portion thereof and a horizontal synchronizing (sync.) signal is disturbed, thus resulting in an image being disturbed.

OBJECTS AND SUMMARY OF THE INVENTION

Accordingly, it is an object of the present invention to provide an improved video signal switching apparatus in which the aforenoted shortcomings and disadvantages encountered with the prior art can be substantially eliminated.

More specifically, it is an object of the present invention to provide a video signal switching apparatus in which, even when a plurality of video signals are switched, the horizontal synchronizing signal can be prevented from being disturbed, thereby a satisfactory image being maintained.

It is another object of the present invention to provide a video signal switching apparatus which can be applied to a camera switcher.

As an aspect of the present invention, an apparatus for switching a video signal comprises a switch for switching a video signal from one to another, a memory for storing an output of the switch, a detector for detecting a switch signal, a switch control circuit for controlling the switch in response to the switch signal, and a memory control circuit for controlling writing and reading of the memory, wherein when the switch signal is detected, the memory control circuit continues to write one video signal until a sync. (synchronizing) signal of the one video signal is detected and after a predetermined period write another video signal when a sync. signal of the other video signal is detected.

The above and other objects, features, and advantages of the present invention will become apparent in the following detailed description of an illustrative embodiment thereof to be taken in conjunction with the accompanying drawings, in which like reference numerals are used to identify the same or similar parts in the several views.

DETAILED DESCRIPTION OF THE PREFERRED EMBODIMENT

An embodiment of the video signal switching apparatus according to the present invention will hereinafter be described with reference to FIGS. 3 and 4.

Figure 1:
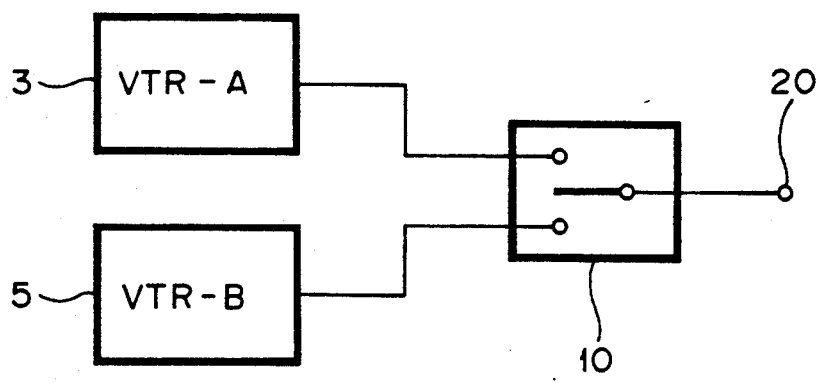
FIG. 1 is a schematic block diagram showing an arrangement of a video signal switching apparatus according to an example of the prior art.
Figure 2:
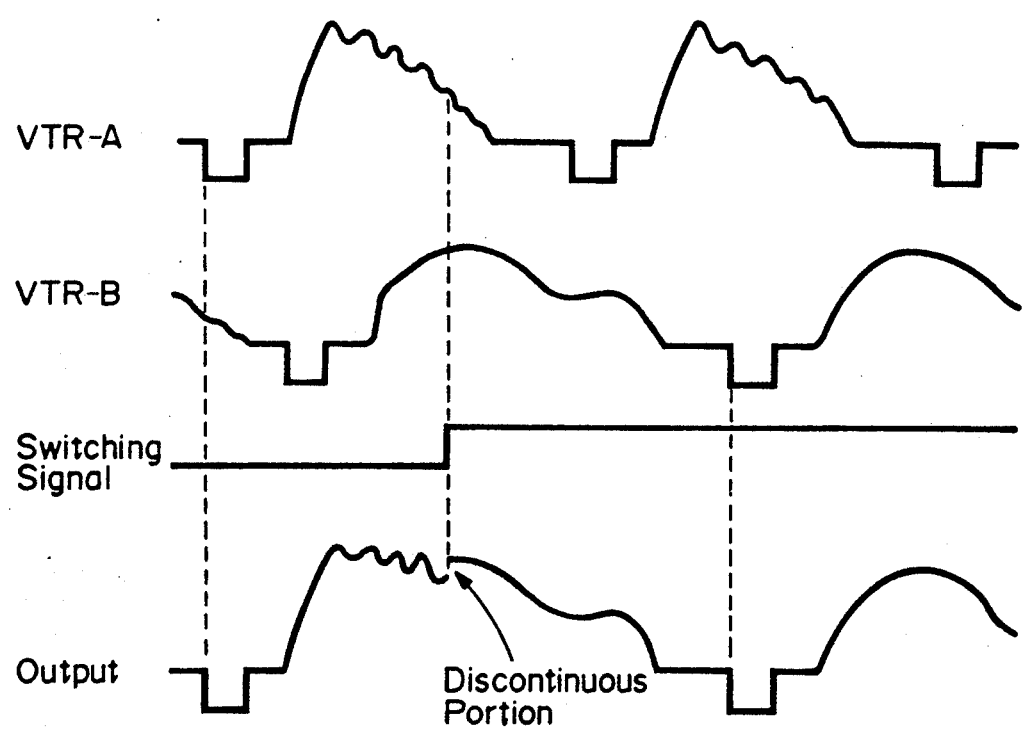
FIG. 2 is a timing chart used to explain operation of the video signal switching apparatus according to the example of the prior art.
Figure 3:
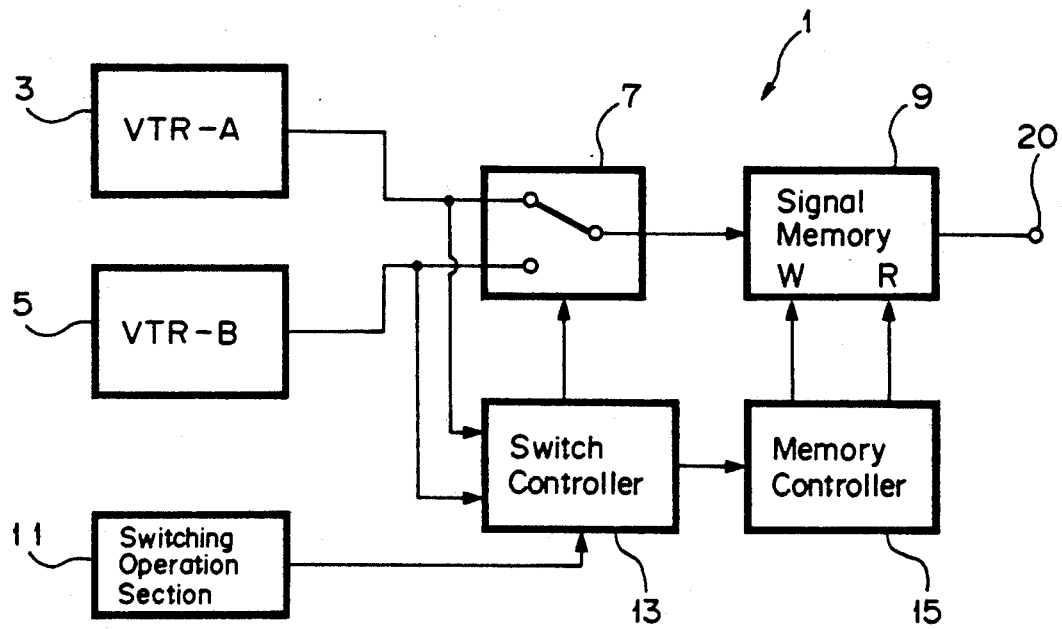
FIG. 3 is a schematic block diagram showing an embodiment of a video signal switching apparatus according to the present invention.

As shown in FIG. 3, there is provided a video signal switching apparatus 1 to which the present invention is applied. In this video signal switching apparatus 1, video signals from a VTR-A 3 and a VTR-B 5 are input to a video memory (a digital memory) 9 through a change-over switch (video signal switching and selecting means) 7, and an output from the video memory 9 is output from an output terminal 20 and delivered to a display section (not shown) or the like.

The change-over switch 7 is changed in position by a switching controller (switching detecting means) 13 which detects an output signal of a switching operation section 11 each time the VTR-A 3 or VTR-B 5 is selected by the switching operation section 11.

The switching controller 13 is also supplied with output signals from the VTR-A 3 and the VTR-B 5 and supplies write (W) and read (R) timing signals through a memory controller 15 to the video memory 9 in response to the operation of the switching operation section 11 (first, second and third control means).

It is possible that the write and read timing signals are asynchronous.

The switching controller 13 is mainly formed of, for example, a microcomputer and detects vertical synchronizing signals (first and second vertical synchronizing signals, respectively) of the VTR-A 3 and the VTR-B 5 under the condition that the switching detecting signal is detected (first and second synchronizing signal detecting means).

The processing done by the switching controller 13 will be described next.

Figure 4:
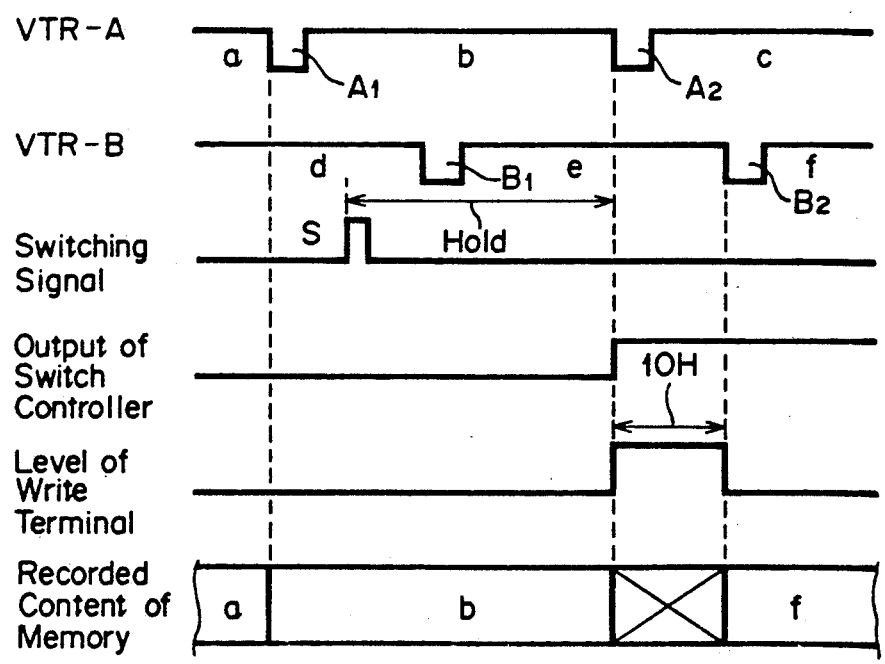
FIG. 4 is a timing chart used to explain operation or the like of a switch controller provided in the above video signal switching apparatus of the present invention.

As will be understood from FIG. 4, when the VTR-A 3, for example, outputs respective video signals a, b, c before and after two vertical synchronizing signals $A_1$ and $A_2$ and when the VTR-B 5 outputs respective video signals d, e, f before and after two vertical synchronizing signals $B_1$ and $B_2$, if the switching detecting signal S is output, then the video signals a and b from the VTR-A 3 will be continuously input to the video memory 9.

That is, as shown in FIG. 4, when the video signal b is input to the video memory 9, the switching detecting signal S is detected. Also, even when the vertical synchronizing signal $B_1$ of the VTR-B 5 is detected, the signal S is held and the video signal b is continuously input to the video memory 9 until the vertical synchronizing signal $A_2$ is detected.

When the vertical synchronizing signal $A_2$ is detected, the switch controller 13 operates the change-over switch 7 in accordance with the thus held signal S, thus inhibiting both the outputs from the VTR-A 3 and the VTR-B 5 being input to the video memory 9 (the level at the W terminal goes high).

After the switching operation, a clock in the synchronizing system is disturbed during approximately 10H period (H represents one horizontal scanning period) so that, if the vertical synchronizing signal B is input during this period, then the clock will be hindered from being stabilized. Therefore, it is preferable that the level at the W terminal is selected to be high for at least about 10H.

When the vertical synchronizing signal $B_2$ of the VTR-B 5 is detected, the change-over switch 7 is operated so as to input the video signal f from the VTR-B 5 to the video memory 9.

As described above, in this embodiment, if the switching operation section 11 is operated when the video signal of the VTR-A 3 is input to the video memory 9, the change-over switch 7 will not be changed in position until the input of at least the video signal b (one field time) to the video memory 9 is finished.

The video signal f from the VTR-B 5 is input to the video memory 9 in synchronism with the vertical synchronizing signal $B_2$. As described above, the signal written in the memory is read out therefrom on the basis of the reference clock, whereby the video signal in which neither the image signal nor the synchronizing signal is disturbed can be obtained at the output terminal 20.

Accordingly, even if the synchronizing signals of the VTR-A 3 and VTR-B 5 are asynchronous, a synchronization disorder will not occur, thus making it possible to avoid disadvantages such as the disturbance of image and so on. Thus, the image can be switched naturally.

During video edit, so-called cut-in and cut-out may be made without operating the VTR-A 3 and VTR-B 5.

Furthermore, in the apparatus such as the home VTR or the like using the asynchronous signal, the video signal switching apparatus 1 can be utilized as a vertical blanking switch so that the video signal switching apparatus of the present invention can be applied, for example, to a camera switcher or the like.

If the timing displacement of the vertical synchronizing signals of the VTR-A 3 and VTR-B 5 are less than 10H, then the video signal f of the VTR-B 5 is not written in the memory 9 and after one field period, the next video signal g is written in the memory 9.

As will be understood from the above explanation, in accordance with the video signal switching apparatus of this invention, when the video signals are switched, only one video signal is input to the video memory until the vertical synchronizing signal provided immediately after one video signal is switched is detected, while only the other video signal is input to the video memory after the input of one video signal is finished and the vertical synchronizing signal of the succeeding other video signal is detected.

That is, even if the switching operation is performed, one video signal of at least one field is constantly input to the video memory, while the other video signal is input to the video memory under the condition such that the input of one video signal to the video memory is completed.

Therefore, since neither the synchronizing signal of one video signal nor the synchronizing signal of the other video signal exists in one field in a mixed state, the synchronization disorder can be avoided, thereby the image being switched satisfactorily without disturbance of image.

At least one field portion of one video signal is usually inputted to the video memory, and the other video signal is inputted to the video memory under the condition that the input of the one video signal has been completed.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. An apparatus for switching a video signal comprising:
    switch means having inputs connected to at least two video signal sources operating mutually asynchronously for selecting as an output a video signal from one of said signal sources;
    memory means for storing an output of said switch means;
    means for generating a switch signal;
    detector and switch control means for detecting said switch signal and controlling said switch means in response to said switch signal; and
    memory control means for controlling switching and reading of said memory means, wherein when said switch signal is detected, said memory control means continues to write one video signal until a vertical sync signal of a first one of said at least two video signal sources is detected and after a predetermined number of horizontal scanning line periods to write another video signal when a vertical sync signal of a second one of said at least two video signal sources is detected.

2. An apparatus according to claim 1 wherein said detector and switch control means controls said switch means to switch from said first one of said video signal sources to said second one of said video signal sources at the time when said vertical sync signal from said second one of said video signal sources is detected following said predetermined number of horizontal scanning line periods.

3. An apparatus according to claim 1 wherein said predetermined number of horizontal scanning line periods is 10.

4. An apparatus according to claim 1 wherein said video signal sources comprises a pair of videotape recorders.

* * * * *